(12) United States Patent
Cheney

(10) Patent No.: US 6,374,062 B1
(45) Date of Patent: Apr. 16, 2002

(54) METHOD AND APPARATUS FOR DETERMINING A MAINTENANCE INTERVAL FOR MEDIA-HANDLING MECHANISMS

(75) Inventor: Douglas A. Cheney, Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/802,695

(22) Filed: Mar. 9, 2001

(51) Int. Cl.[7] ............................................... G03G 15/00
(52) U.S. Cl. ................. 399/9; 399/43; 399/45
(58) Field of Search ............................ 399/8, 9, 43, 45, 399/303

(56) References Cited

U.S. PATENT DOCUMENTS 5,184,179 A * 2/1993 Tarr et al. ....................... 399/8
5,666,585 A * 9/1997 Nagira et al. ............... 399/9 X
6,125,994 A * 10/2000 Todome .................. 399/303 X

* cited by examiner

*Primary Examiner*—Fred L. Braun

(57) ABSTRACT

A method and apparatus for determining a maintenance interval for a media-handling mechanism is provided. The determination of the maintenance interval includes the number of media sheets transported by the media-handling mechanism along with additional media information, such as the media size or the media type for each media sheet transported.

15 Claims, 2 Drawing Sheets

METHOD AND APPARATUS FOR DETERMINING A MAINTENANCE INTERVAL FOR MEDIA-HANDLING MECHANISMS

BACKGROUND OF THE INVENTION

1. Field of the Invention

The present invention relates generally to devices employing media-handling mechanisms and, more particularly, to the determination of maintenance intervals for these devices.

2. Related Art

Media-handling mechanisms are incorporated into many types of devices for handling and transporting media. For example, printers, copiers, scanners, and facsimile machines utilize media-handling mechanisms to select a sheet of media from a media input tray, transport the sheet through the device, and deposit the sheet in an output tray. U.S. Pat. Nos. 5,564,847 and 6,167,232, which are incorporated herein by reference in their entirety, are examples of media-handling mechanisms. Media, as used herein, includes paper-based media and transparencies, along with any other type of media suitable for use with the media-handling mechanism or for the particular device incorporating the media-handling mechanism.

Maintenance contracts, warranties, and equipment leases for devices containing media-handling mechanisms often base their charges or services upon an accurate measurement of the use of the corresponding device. Thus, the accurate determination of the maintenance interval, based on the amount of use of the device, is critical for estimating the service requirements and wear-and-tear of the components comprising the media-handling mechanism. For example, an inaccurate maintenance determination may result in a media-handling mechanism or device failure being categorized as a failure covered under a warranty rather than a failure due to a lack of proper maintenance. In contrast, an accurate maintenance determination may result in a more reliable device, increased user or customer satisfaction, improved scheduling of the maintenance cycle and improved bid estimates for maintenance, warranty, or lease agreements, and reduced maintenance costs for parts and labor.

Maintenance intervals for media-handling mechanisms can be based on counting the number of sheets of media that are transported from the input tray. As an example, U.S. Pat. No. 5,793,388, which is incorporated herein by reference in its entirety, provides an example of a page counter used to count the number of pages printed in a printer. The media-handling mechanism requires maintenance, for example, after 350,000 sheets of media are transported from the input tray. The media-handling mechanism, as an example, will include a counter for this purpose. However, some counters neither consider nor correct the count value in the event of a media jam or other malfunction, which prevents a sheet of media drawn from the media input tray from reaching the media output tray.

Furthermore, various sizes and types of media are often transported through the media-handling mechanism. For example, the media size may vary from an envelope (e.g., 99 by 195 mm.) to legal (e.g., 216 by 356 mm.). The media type may also vary in terms of quality, such as ranging from rough, recycled paper to plain, photo-quality paper, for example. Quality refers to the quality of the media in terms of the amount of wear caused by the media on the media-handling mechanism due to its roughness, for example, or due to contaminants contained within or on the media, such as fiber, filler, coatings, or dirt that affect the operation of the media-handling mechanism. As an example, smooth, plain, standard paper would have a higher quality rating than would rough, bond paper.

The size and type of media that is transported through the media-handling mechanism will affect the accuracy of the determination of the maintenance interval, because of the difference in wear-and-tear on the media-handling mechanism from one size or type of media to another size or type. However, the counter that simply counts the number of sheets of media will fail to take these factors into consideration. As a result, there is a need for an improved maintenance interval determination for a media-handling mechanism.

BRIEF SUMMARY OF THE INVENTION

In accordance with embodiments of the present invention, an improved maintenance interval determination for a media-handling mechanism is provided. The determination of the maintenance interval will not only consider the number of sheets of media transported by the media-handling mechanism, but also other factors, such as the size of the media or the quality of the media.

In accordance with one embodiment, a method of determining a maintenance interval for a media-handling mechanism, the method includes determining the number of media sheets transported by the media-handling mechanism; determining a media type for each of the media sheets transported by the media-handling mechanism; and calculating a maintenance interval count based on the number of media sheets transported by the media-handling mechanism and the media type for each of the media sheets. The method may further comprise determining a media size for each of the media sheets transported by the media-handling mechanism, with the maintenance interval count calculation further based on the media size for each of the media sheets transported by the media-handling mechanism.

In accordance with another embodiment, an apparatus having a media transport mechanism includes a processor; a memory, coupled to the processor, storing the number of media sheets transported by the media transport mechanism and at least media size or media type information; and wherein the processor calculates a maintenance interval count based on the number of media sheets transported by the media transport mechanism and at least the media size or the media type information for each media sheet transported.

In accordance with yet another embodiment, a machine-readable medium is provided for use in an apparatus having a media transport mechanism and a processor, the medium having instructions that are executed by the processor to perform a method of determining a maintenance interval for the media transport mechanism. The method includes receiving the number of media sheets transported by the media transport mechanism; receiving at least a media type or a media size for each of the media sheets transported by the media transport mechanism; and calculating a maintenance interval count based on the number of media sheets transported by the media transport mechanism and at least the media type or the media size for each of the media sheets.

A more complete understanding of the present invention will be afforded to those skilled in the art, as well as a realization of additional advantages thereof, by a consideration of the following detailed description of one or more embodiments. Reference will be made to the drawings that will first be described briefly.

Figure 1:
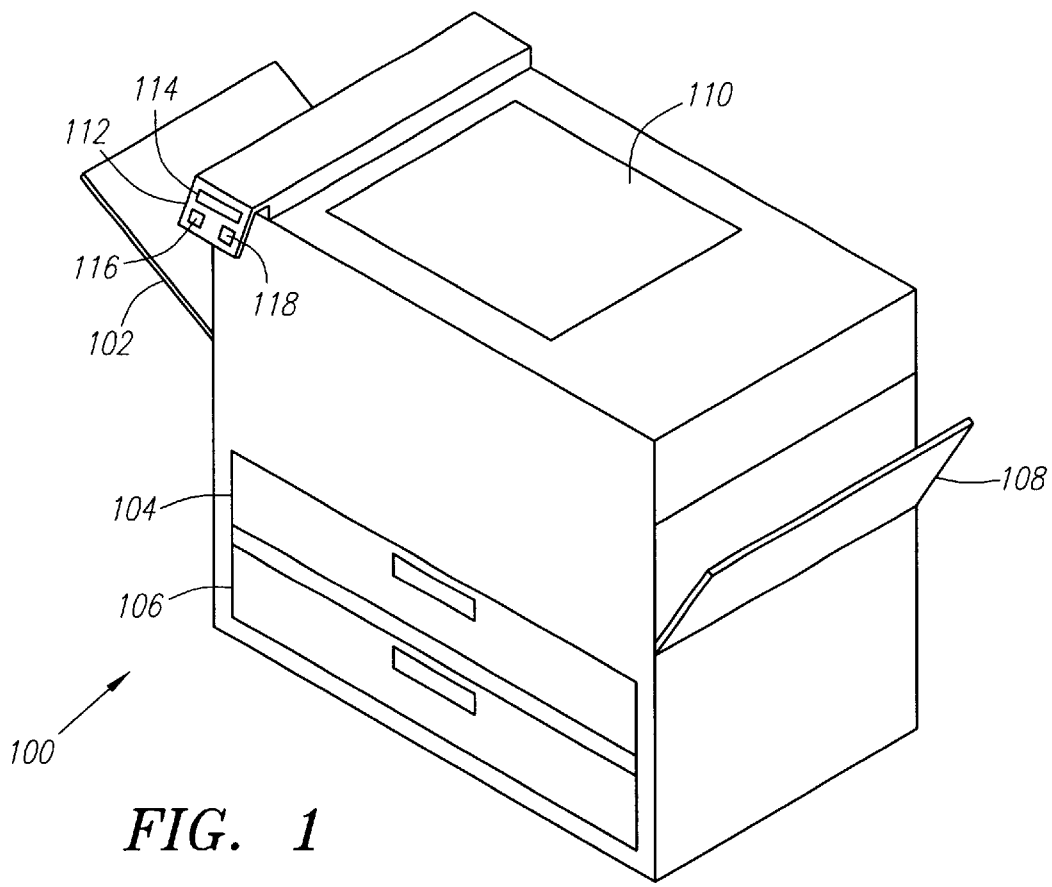
FIG. 1 illustrates an exemplary device incorporating a media-handling mechanism, in accordance with an embodiment of the present invention.

The various exemplary embodiments of the present invention and their advantages are best understood by referring to the detailed description that follows. It should be understood that exemplary embodiments are described herein, but that these embodiments are not limiting and that numerous modifications and variations are possible in accordance with the principles of the present invention. In the drawings, like reference numerals are used to identify like elements illustrated in one or more of the figures.

DETAILED DESCRIPTION OF THE INVENTION

FIG. 1 illustrates an exemplary device 100 incorporating a media-handling mechanism, in accordance with an embodiment of the present invention. Device 100 may represent a printer, a copier, a facsimile machine, a scanner, or any type of device employing a media-handling mechanism.

Device 100 includes media input bins 104, 106, and 108, and media output bins 102 and 110. Media input bins 104, 106, and 108 store media for transport by the media-handling mechanism (not shown) within device 100. These media bins may store various sizes and types of media, depending upon the desired use of device 100. For example, media input bin 104 stores letter-size letterhead sheets (e.g., 8.5 by 11.0 inches) of media, while media input bin 106 stores legal-size plain sheets (e.g., 8.5 by 14.0 inches) of media. Media input bin 108 may be used to store media and is also useful for manually feeding device 100, with a desired size or type of media. Media output bins 102 and 110 are used to store media after it has been transported through device 100.

Depending upon the selected media input bin (i.e., media input bin 104, 106, and 108), media output bin (i.e., media output bin 102 and 110), and desired function of device 100, different media-handling mechanism media paths (not shown) through device 100 may be utilized. For example, if media is selected from media input bin 104 and transported to media output bin 102, this media may take a different path through device 100 than media transported from media input bin 108 to media output bin 110. Also, as an example, if device 100 represents a copier, the media may take a different media path depending upon whether a one-sided or two-sided copy is selected.

Device 100 further includes a control station 112 having a display 114 and user-operated input keys 116 and 118. Input keys 116 and 118 and display 114 are coupled to electrical circuitry (not shown) within device 100, such as a processor and a memory or a programmable logic device or application specific integrated circuit, which controls device 100. A user can set various functions of device 100 by using input keys 116 and 118 and verify their setting or view information, provided by device 100, through display 114. For example, a user may input the size, type, or other parameters pertaining to media stored within media input bins 104, 106, and 108. Alternatively, the various functions or parameters may be set or input by remote access, such as with a computer connected directly to device 100 or through a network or using a browser through a network (e.g., Internet or Intranet).

Figure 2:
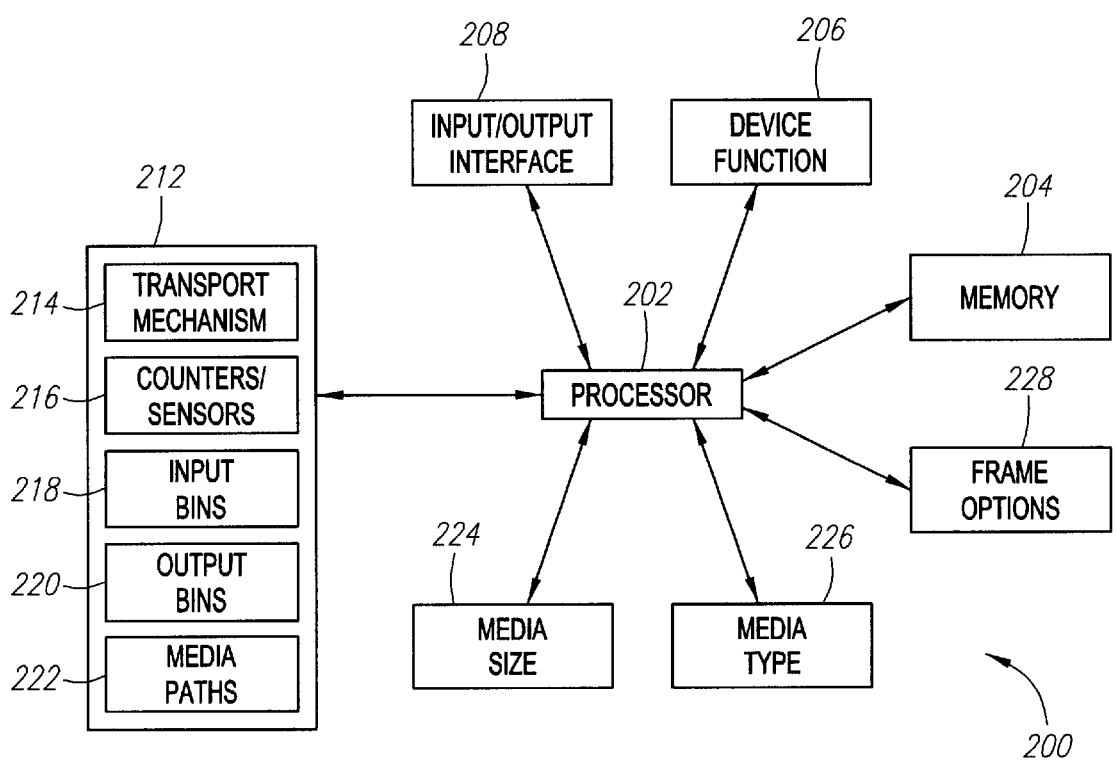
FIG. 2 is a block diagram illustrating a device incorporating a media-handling mechanism, in accordance with an to embodiment of the present invention.

FIG. 2 is a block diagram illustrating a device 200 incorporating a media-handling mechanism, in accordance with an embodiment of the present invention. Device 200 includes a processor 202 and a memory 204 for storing information. For example, memory 204 stores one or more software programs or instructions executed by processor 202 and may also store print image data. Alternatively, memory 204 may, for example, be a portable machine-readable medium, such as a floppy disk, removable hard drive, or compact disk, which is inserted into device 200, or memory 204 may reside within device 200 and store information loaded from a portable machine-readable medium inserted into device 200. Furthermore, for example, memory 204 may include random access memory for storing software programs, instructions, or code along with image data (i.e., data to be printed as a print job) and nonvolatile memory for storing configuration information. The processor 202, may alternatively, for example, be a programmable logic device or application specific integrated circuit, which may further incorporate memory 204.

A device function 206 represents the function performed by device 200, such as one or more of printing, copying, faxing, or scanning functions, for example. An input/output interface 208 provides an interface for the transfer of information from, to, or between device 200 (e.g., processor 202 and/or memory 204) and an external device (not shown) or a user. For example, device 200 may represent a printer that is coupled through input/output interface 208 to a computer or computer network. A user may select or set various parameters through a computer software interface, such as with a printer driver utility or printer software when selecting various print options for the print job. Alternatively, for example, input/output interface 208 includes a keypad and a display (similar to control station 112 illustrated in FIG. 1), which allows a user to program, select, or set various parameters of device 200, or includes a device to receive a machine-readable medium. The various parameters refer to media size and media type, as discussed further herein, which may further include print format (e.g., portrait or landscape), wear factor, media type grade, media size factor, media type factor, and contamination grade.

Device 200 further includes a media handler 212 that has a transport mechanism 214 that transports media from input bins 218 to output bins 220 through one or more media paths 222. One or more counters and/or sensors 216 are provided within media handler 212 to provide information to processor 202. For example, counters/sensors 216 provide information regarding the number of sheets of media transported by transport mechanism 214, which media path 222 was utilized, and whether a media jam has occurred. Counters/sensors 216 may further provide information regarding the size or type of media by directly sensing this information from the media.

Processor 202 of device 200 receives media information, including media size 224 and media type 226, from counters/sensors 216 and/or through input/output interface 208 or from information stored in memory 204. Media size 224 refers to the size of the sheet of media transported through device 200. For example, media size includes letter (216 by 279 mm.), legal (216 by 356), executive (184 by 267 mm.), A3 (297 by 420 mm.), A4 (210 by 297 mm.), A5 (148 by 210 mm.), envelope #10 (105 by 241 mm.), envelope C5

(162 by 229 mm.), and double postcard (148 by 200 mm.). Media size may further include custom-size media of any dimensions suitable for transport through device 200. Media type 226 refers to the type of media sheet transported through device 200. For example, media type 226 includes bond, cardstock, color, labels, letterhead, plain, preprinted, prepunched, recycled, rough, and transparency. Media type 226 also refers to the quality of the sheet of media. For example, media type 226 may provide information as to the roughness of the media and the materials utilized, such as the type of pulp or fibrous material and whether filler, coatings, or other contaminants (e.g., talc or chalk) are contained within the media.

Media size 224 and media type 226 information is provided to processor 202 by counters/sensors 216 and/or by a user or external device through input/output interface 208. For example, a user can program, select, or set various media size and media type parameters, either through an external device (e.g., a computer coupled to device 200) or through a keypad (e.g., similar to control station 112 of FIG. 1). These parameters, which may be stored in memory 204, include media size and media type for media placed in each input bin 218. The user may obtain media size and media type information, for example, from information printed on the media packaging. The media type information may simply specify the media type (e.g., plain or letterhead) or further include or be represented by a media type grade, media type factor, wear factor, or contamination grade, which would include the quality of the media, such as the degree of roughness or whether contaminants are present within the media.

Frame options 228 provides processor 202 of device 200 with additional information affecting transport mechanism 214. Frame options 228 provides, for example, whether media is transported through device 200 as a portrait or a landscape perspective and can be provided through input/output interface 208 or determined through counters/sensors 216. The required maintenance interval for media handler 212 will likely vary depending upon this factor due to the amount of media surface area in a given direction contacting transport mechanism 214.

Figure 3:
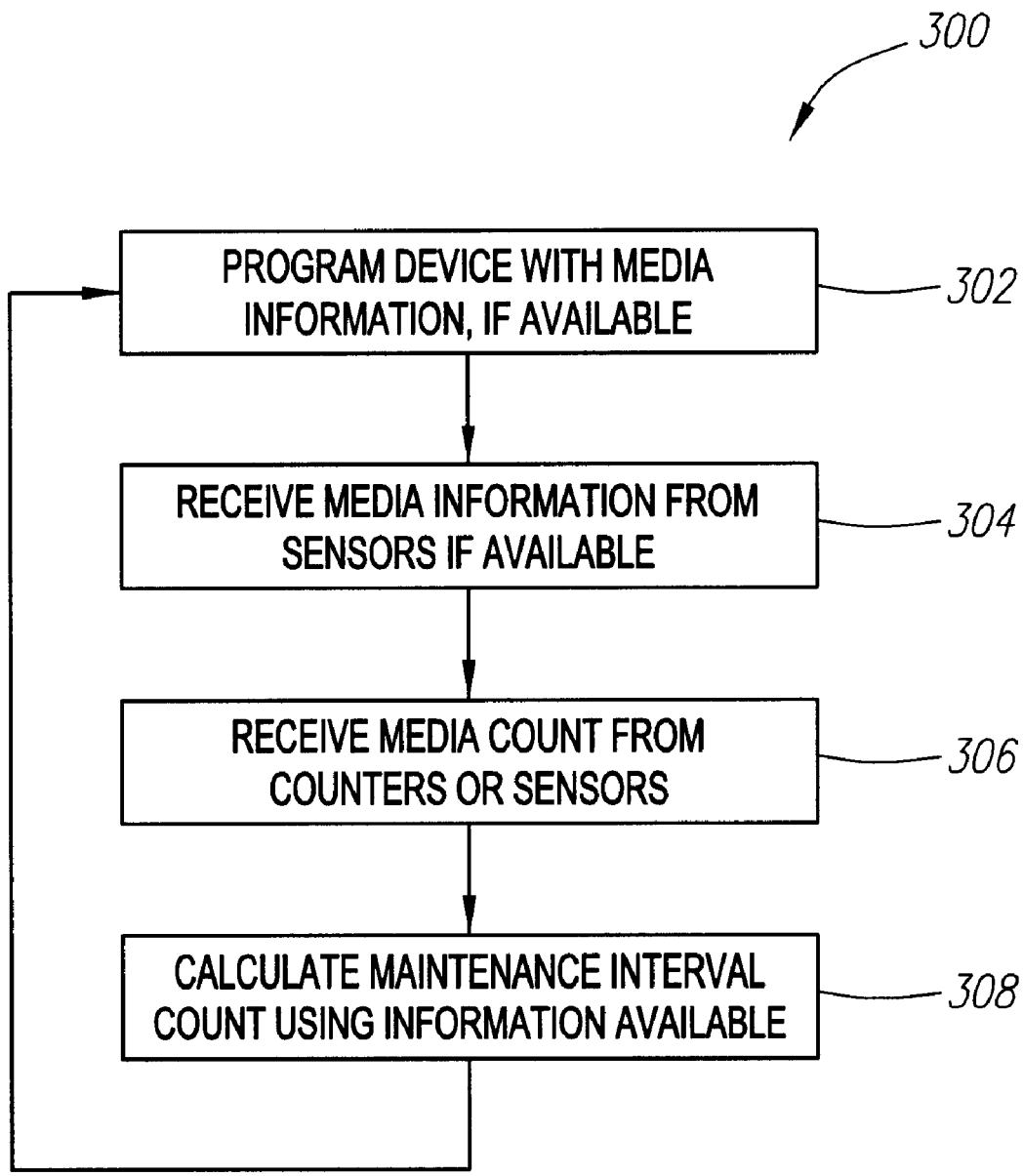
FIG. 3 is a flowchart illustrating maintenance interval determination steps, in accordance with an embodiment of the present invention.

FIG. 3 is a flowchart 300 illustrating maintenance interval determination steps, in accordance with an embodiment of the present invention. Step 302 programs the device with the media information, if available, while step 304 receives the media information from sensors, if available, within the device. Media information includes media size, media type, and their associated parameters, and other factors affecting the maintenance interval of the media-handling mechanism, such as whether the media is transported as portrait or landscape.

Steps 302 and 304 collect the media information from whatever source is available. For example, if the device is designed to allow a user to provide media information via an input/output interface (e.g., device keypad or selection through a computer interface), then sensor information is not required or may supplement the information provided through the input/output interface. For example, step 302 includes receiving the information through an input/output interface and/or from memory, if media information was previously programmed. As an example, if the device is a printer and a user prints from their computer (connected to the printer) a two-page document and the media information has been programmed and stored in the memory of the device or the user provides the information through a printer software program, then step 302 receives the media information and sensor information concerning media size or media type is not required. Alternatively, if the user is unable to provide the media information, either through lack of an input/output interface or because the user has failed to provide the information, then sensor information is required. If the device does not have sensors that provide this information, then an estimated maintenance interval may be determined based on the information available, as discussed below.

Step 306 receives the media count from counters or sensors monitoring the number of sheets of media that are transported by the media-handling mechanism. For example, a counter counts the number of sheets of media that are transported by the media-handling mechanism and deposited in an output bin. An example of this counting operation is discussed in U.S. Pat. No. 6,052,547, which is incorporated herein by reference in its entirety. Alternatively, the count is provided through an interface (e.g., input/output interface 208). For example, if the device is a printer and a print request for five pages of a document is received, then the media count is five for this example. A counter may further verify that five pages or sheets of media were deposited in the output bin.

Step 308 calculates the maintenance interval count based on the information available. The following exemplary formula provides the count for the maintenance interval: Count=(media sheet count)×(media size factor)×(media type factor).

The count for the maintenance interval is determined by adjusting the actual count of the number of sheets of media (i.e., media sheet count) that is transported through the device, for each media path, by a media size factor and a media type factor. The media size factor and the media type factor are numbers that adjust the media sheet count by the respective affect the media size and the media type for a particular media has on the maintenance interval relative to a nominal value.

As an example, a typical maintenance interval is 350,000 counts, with this interval based on plain (8.5 by 11 inch), white, xerographic paper, which corresponds to the nominal values when transported in the portrait format. Thus, the media size factor and the media type factor each equal one. If only legal (8.5 by 14 inch), white, recycled paper is utilized by the device, the maintenance interval for the device should be shorter (i.e., fewer counts), because the larger size and rougher, poorer quality paper (compared to the plain, white, xerographic paper) will cause greater wear-and-tear on the media-handling mechanism. If the media size factor for the legal, recycled paper is 1.2 for portrait format and 1.3 for landscape format, and the media type factor is 1.1, then the maintenance interval count of 350,000 counts will be reached after only 265,152 media sheet counts in portrait format (i.e., 350,000 is exceeded by 265,152×1.2×1.1).

Table 1 provides exemplary values for various media. As shown in the table, the media size factor varies depending upon the media size and whether the media is transported as portrait or landscape. The media type factor will vary depending upon the type and quality of the media. These media parameters are used in the maintenance interval count calculation to determine the maintenance interval based on the media utilized. Alternatively, these parameters could be combined into one media factor. For example, legal, recycled media transported in the portrait format could have a media factor of 1.32 (i.e., 1.2×1.1), which could be multiplied by the media sheet counts to obtain the maintenance interval as calculated above.

TABLE 1

Exemplary Media Size/Type Factor Values

| MEDIA SIZE | MEDIA SIZE FACTOR | | MEDIA TYPE | MEDIA TYPE FACTOR |
|---|---|---|---|---|
| | PORTRAIT | LANDSCAPE | | |
| Letter | 1.0 | 1.1 | Bond | 1.2 |
| Legal | 1.2 | 1.3 | Plain | 1.0 |
| Executive | 0.8 | 0.9 | Recycled | 1.1 |

If one or more parameter values are not available, a default setting may be utilized or a default setting may be provided, such as a setting based on anticipated use. For example, if media type factor is not provided, the default value of "one" for media type factor could be used. The maintenance interval count calculation will then still reflect the media size factor adjustment to the media sheet count. Similarly, a default media size factor of "one," for example, may also be used when media size factor information is not available.

It should be understood that the formula, media size factors, and media type factors provided herein are exemplary, and that numerous modifications and variations are possible in accordance with the principles of the present invention. For example, as noted above, the media parameters could be combined into one media factor and used along with the actual media count or substituted for the actual media count. Alternatively, various media size and media type parameters may be combined or used separately to determine the maintenance interval count.

The formula may also be modified to add or subtract one or more values from the media sheet count or the media sheet count may increment by a certain value based on media size and media type information.

As described herein, an improved maintenance interval determination for media-handling mechanisms is provided. The determination of the maintenance interval not only considers the number of sheets of media, but also includes other factors influencing the maintenance interval. For example, media size, including whether the format is portrait or landscape, is utilized. The media type, including the quality of the media, may also be utilized. By including one or more of these additional factors, a more accurate maintenance interval determination can be provided. For example, the maintenance interval determination is utilized to determine which discrete components for each media path require replacement or maintenance. A further description regarding replacement of discrete components can be found in a patent application U.S. Ser. No. 09/800,068, filed on Mar. 6, 2000 entitled "Method For Selective Replacement Of Discrete Print Media Path Components," by Douglas A. Cheney, Docket No. 10004015-1, which is incorporated herein by reference in its entirety.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A method of determining a maintenance interval for a media-handling mechanism, the method comprising:
   determining the number of media sheets transported by the media-handling mechanism;
   determining a media type for each of the media sheets transported by the media-handling mechanism; and
   calculating a maintenance interval count based on the number of media sheets transported by the media-handling mechanism and the media type for each of the media sheets.

2. The method of claim 1, further comprising determining a media size for each of the media sheets transported by the media-handling mechanism, wherein the maintenance interval count calculation is further based on the media size for each of the media sheets transported by the media-handling mechanism.

3. The method of claim 2, wherein the media size determination further includes determining whether each of the media sheets is transported in portrait or landscape format.

4. The method of claim 1, further comprising determining a media path for each media sheet transported by the media-handling mechanism, wherein the maintenance interval calculation is made for each of the media paths.

5. An apparatus having a media transport mechanism, the apparatus comprising:
   a processor;
   a memory, coupled to the processor, storing the number of media sheets transported by the media transport mechanism and at least media size or media type information; and
   wherein the processor calculates a maintenance interval count based on the number of media sheets transported by the media transport mechanism and at least the media size or the media type information for each media sheet transported.

6. The apparatus of claim 5, wherein the processor comprises a programmable logic device or an application specific integrated circuit.

7. The apparatus of claim 5, further comprising at least one counter or sensor for providing at least one of the number of media sheets transported by the media transport mechanism, the media size of each media sheet transported, and the media type of each media sheet transported.

8. The apparatus of claim 5, wherein the apparatus comprises at least one of a printer, a copier, a scanner, and a facsimile machine.

9. The apparatus of claim 5, wherein the media transport mechanism further comprises at least two different media paths, and wherein the processor calculates the maintenance interval count for each of the media paths.

10. The apparatus of claim 5, wherein the memory further stores instructions that are executed by the processor to perform the maintenance interval count calculation.

11. The apparatus of claim 5, further comprising an input/output interface for providing at least one of the number of media sheets transported by the media transport mechanism, the media size of each media sheet transported, and the media type of each media sheet transported.

12. The apparatus of claim 5, wherein the media size further includes whether each of the media sheets is transported in portrait or landscape format.

13. A machine-readable medium for use in an apparatus having a media transport mechanism and a processor, the medium having instructions that are executed by the processor to perform a method of determining a maintenance interval for the media transport mechanism, the method comprising:
   receiving the number of media sheets transported by the media transport mechanism;
   receiving at least a media type or a media size for each of the media sheets transported by the media transport mechanism; and calculating a maintenance interval count based on the number of media sheets transported by the media transport mechanism and at least the media type or the media size for each of the media sheets.

14. The machine-readable medium of claim 13, wherein the media size further comprises whether each of the media sheets is transported in portrait or landscape format.

15. The machine-readable medium of claim 13, further comprising determining a media path for each media sheet transported by the media transport mechanism, wherein the maintenance interval calculation is made for each of the media paths.

\* \* \* \* \*